Sept. 20, 1960 R. J. WENDT 2,953,036
CONTROL DEVICES FOR MOTOR VEHICLES
Filed Oct. 2, 1957
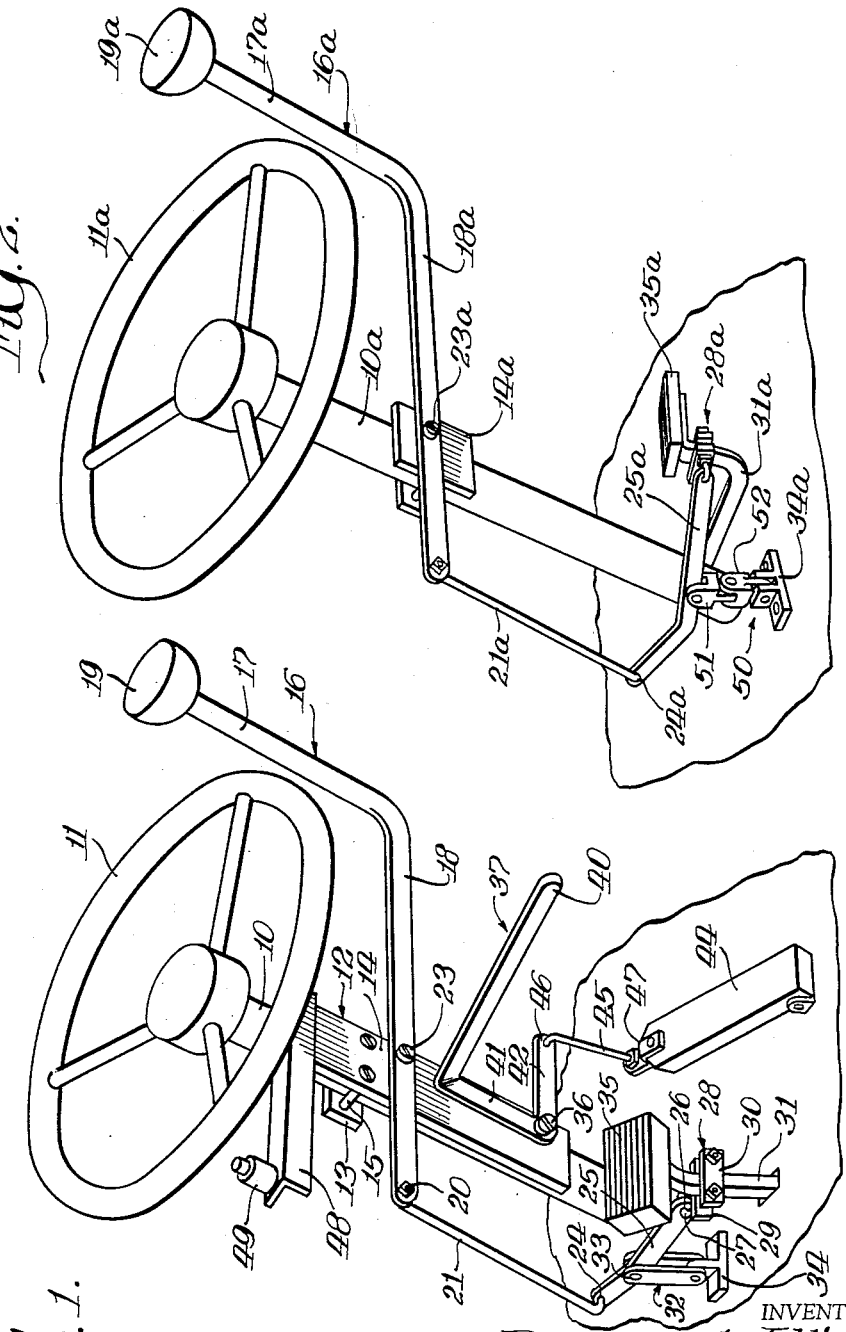
INVENTOR.
Raymond J. Wendt,
BY
Atty's.

United States Patent Office 2,953,036
Patented Sept. 20, 1960

2,953,036

CONTROL DEVICES FOR MOTOR VEHICLES

Raymond John Wendt, 1712 N. Halsted St.,
Chicago 14, Ill.

Filed Oct. 2, 1957, Ser. No. 687,819

5 Claims. (Cl. 74—484)

The present invention relates to control devices for automobiles to enable physically handicapped persons, such for example, as amputees, and the like, to drive.

Broadly, one object of this invention is to provide control devices for automobiles which will enable an operator to drive and control an automobile, including the operation of the brake and accelerator pedals, almost entirely by the use of the hands.

Another object of this invention is to provide control devices that can be readily attached to an automobile now in use without necessitating any alteration in the present operating equipment other than simply applying the present invention thereto.

A further object of this invention is to provide a control mechanism for automobiles which will approach the maximum of simplicity of installation and operation.

Specifically, this invention is concerned with control devices in the nature of hand and/or leg operating means mounted on the steering column of an automobile and connected to the usual brake and accelerator pedals in such a way that the pedals remain fully operable in the normal way by a driver having no use of his feet.

Briefly, this invention comprises an attachment for the hand operation of the foot brake pedal and an attachment for the knee or leg operation of the accelerator, each comprising linkage means attached to the respective brake pedal and accelerator pedal, mounted on the steering column, and each respectively so constructed and arranged to be operable by the hand and by the side of the leg or the knee. One embodiment of the invention is especially adapted to be attached to automobiles having the brake pedal on the left hand side of the steering column, and another embodiment is especially adapted to be attached to automobiles having the brake pedal on the right hand side of the steering column; both attachments being operable by the right hand. A dimmer switch for the headlights is further provided on the steering column, conveniently located so that an amputee may completely operate the automotive vehicle under all normal driving conditions.

Accordingly, still another object of this invention is the provision of an attachment for automobiles with brake pedals on the left or the right side of the steering column and the provision of a dimmer switch conveniently located to enable a disabled person to operate an automobile under normal conditions.

Other objects will be apparent upon consideration of the following description taken in connection with the accompanying drawing and forming a part thereof and wherein:

Figure 1 is a perspective view, partially broken away, illustrating to advantage the brake pedal attachment and the accelerator attachment mounted on the steering column of an automobile, together with the dimmer switch and bracket holding the latter on the steering column; and Figure 2 is a perspective view, partially broken away, illustrating a modification of the brake linkage means where the brake pedal is located on the right-hand side of the steering column.

Referring now to the drawings, and particularly to Figure 1, there is illustrated a steering column 10 of an automobile in which is rotatably mounted a steering wheel 11 for guiding the automobile in the known manner, and clamping means 12 comprising a relatively thin top bar 13 and an elongated relatively thin plate 14 secured to each other by bolt means 15 to clamp the steering column 10 therebetween. The bar 14, being relatively thin and relatively long, is disposed with its major length co-axially of the steering column for a purpose hereinafter to be explained.

A handle brake lever 16, of L-shape with a substantially vertical arm 17 and a horizontal arm 18 is provided at one end with a handle 19, and at the other end with a pivotal connecting means 20 comprising an aperture and bolt means, to provide a pivotal connection with a connecting link 21, in this embodiment the latter being a rod. The horizontal arm 18 of the handle brake lever 16, being disposed substantially parallel and below the steering wheel 11, is of sufficient length to provide suitable clearance of the steering wheel by the hand handle 17 and is apertured intermediate its length to receive a bolt means 23 which provides the pivotal connection about the steering column between the handle 19 to move the link 21 upwards or downwards relative to the steering column.

Connecting means 21 on the end opposite the connecting means 20 is formed to be received in an aperture 24 formed on one end of a brake arm lever 25. Obviously, the connecting means between the link 21 and the brake arm lever 25 may be constructed in any suitable manner, the bending of the end of link 21 to fit into the aperture 24 being the most convenient.

Brake arm lever 25 is a relatively long, relatively thin bar having a slight bend therein and apertured at the end opposite to the aperture 24, as shown at 26, to receive a U-shaped rod 27 forming part of a connecting bracket indicated in its entirety as 28. Connecting bracket 28 comprises a pair of bars 29 and 30 disposed on opposite sides of the brake pedal lever 31 and clamped thereto by means of bolts on the ends of the U-shaped rod 27.

Intermediate the ends of the brake arm lever there is provided a lever type connection to permit movement of the entire linkage means. This connection comprises a hinge-like toggle indicated in its entirety as 32, having one end pivotally connected to the lever 25 as by bolt means 33, and the other end pivotally connected to a T-shaped member 34 affixed to the floor board of the automotive vehicle by any suitable means (not shown).

From the above description, it is apparent that the movement of the handle 19 will ultimately cause the brake pedal lever 31 to move in a manner similar to the normal braking operation of an operator placing his foot on the foot pedal 35; the usual return springs, attached to the brake pedal, causing the brake to return to the unbraked position in the usual manner.

Plate 14 is also provided with a pivotal connection, as by aperture and bolt means 36, substantially below the pivotal connection 23 of the brake lever 16, for an accelerator lever indicated in its entirety as 37. Accelerator lever 37 comprises three arms, 40, 41 and 42; arms 41 and 42 being L-shaped in the same plane and operable parallel to the brake arm 16; and arm 40 extending normal to the steering column and toward the seat so as to be operable by the knee or the side of the leg of an operator. Movement of the arm 40, as thus disposed, will cause the arm 42 to rotate about the pivot point 36 so as to move accelerator pedal 44 upwards and downwards to which it is attached through connecting link 45. Connecting link 45 is suitably affixed in any convenient manner to the top of the accelerator pedal, as by bracket 47 and pivotally connected to the arm 42 by bending the rod 45 into aperture 46 in one end of the arm 42.

From the above description, it can be seen that movement of the arm 40 to the right as shown in the drawing will urge the accelerator pedal downwardly and, vice versa, a release of force against the arm 40 will cause the accelerator pedal to return to its idling position. The springs of the normal automobile to move the accelerator to its idling position upon the release of force by the foot is sufficient to cause the arm 40 to return to its original position.

From the above description, it can be seen that a handicapped person may conveniently operate the brake pedal 35 by the movement of the handle 17 and the accelerator pedal 44 by the movement of the accelerator lever arm 40 so as to operate the automobile in a normal manner. To add to this convenience in the operation of the vehicle by a handicappel person, the steering column 10 is further provided with a bracket 48 suitably attached thereto, having a switch 49 connected to the headlights by which the operator may dim the lights for night driving. Since the connection of the switch 49 to the headlights is well known, no further description is deemed necessary herein.

Turning now to Figure 2, there is illustrated a hand brake lever similar in operation to the one described in connection with Figure 1, except suitably adapted to operate a brake lever located on the right-hand side of the steering column. For purposes of convenience, similar parts are marked with the same reference numeral as used in connection with Figure 1, except the suffix "a" is added thereto.

To suitably adapt the lever shown in Figure 2 to a foot brake located on the right-hand side of the steering wheel, the brake lever bar 25a is slightly longer than brake lever bar 25, and pivoted at its substantial midportion on a swivel or universal joint, indicated in its entirety as 50. Swivel joint 50 comprises a pair of toggles 51 and 52, pivotally connected to the bar 25a, to the T-shaped plate 34a and to each other, to permit universal movement between the bar 25a and the plate 34a. In this manner, movement of the handle 19a causes the foot pedal 35a to move downwardly to cause a braking action, and the operation of the universal joint 50 permits a swivel action of the working parts under such conditions. It is to be noted that the plate 14a is shorter than the plate 14 on Figure 1, since in this embodiment the accelerator actuating lever is omitted for purposes of illustration. An accelerating lever 27 could be mounted in a manner similar to that shown in Figure 1 by merely elongating the plate 14a as disclosed. In like manner, the dimmer switch 48 and 49 could be likewise incorporated into the embodiment shown in Fig. 2 as desired.

While I have described my invention in connection with enabling physically handicapped persons to drive, it is obvious that the invention is also useable as a convenient and pleasurable device to relieve foot and leg fatigue during long trips and the like. Furthermore, while I have shown the accelerator lever 37 pivotally connected to the steering column, I contemplate within this disclosure of pivotally connecting this lever to the dashboard by means of a clamp or any suitable means arranged to permit convenient operation of the accelerator lever 37 by the leg.

While this invention has disclosed two embodiments and has been described with reference to a particular direction, it is to be understood that this is merely to facilitate description and by way of illustration, and not by way of limitation, the scope of this invention being defined solely by the appended claims which should be construed as broadly as the prior art will permit.

I claim:

1. In an automotive vehicle having a steering wheel, a steering column, a brake pedal, and a vehicle floor; an attachment for operating said brake pedal by hand comprising a hand lever having an upright arm portion provided with a handle free of said steering wheel and a horizontal arm portion, said horizontal arm portion being pivotally connected to said steering column by a pivot fixed against movement longitudinally with respect to said steering column, a brake lever pivotally connected at one end to said brake pedal, means pivotally connecting said brake lever intermediate its ends to said vehicle floor, and a connecting link having mechanical connection at one end with said horizontal arm portion of said hand lever and mechanical connection at its other end with the opposite end of said brake lever.

2. In an automotive vehicle having a steering wheel, a steering column, a brake pedal, and a vehicle floor; an attachment for operating said brake pedal by hand comprising a hand lever free of said steering wheel and having an arm portion substantially parallel with the steering column and another arm portion disposed below said steering wheel and transverse to said steering column, said arm portion of said hand lever disposed below said steering wheel being pivotally connected to said steering column by a pivot fixed against movement longitudinally with respect to said steering column, a brake lever pivotally connected at one end to said brake pedal, means pivotally connecting said brake lever intermediate its ends to said vehicle floor, and a connecting link having mechanical connection at one end with said horizontal arm portion of said hand lever and mechanical connection at its other end with the opposite end of said brake lever.

3. In an automotive vehicle having a steering wheel, a steering column, a brake pedal and vehicle floor; an attachment for operating said brake pedal by hand comprising a hand lever having an upright arm portion provided with a handle free of said steering wheel and a horizontal arm portion, said horizontal arm portion being pivotally connected to said steering column by a pivot fixed against movement longitudinally with respect to said steering column, a brake lever pivotally connected to said brake pedal, means pivotally connecting the central portion of said brake lever to said vehicle floor, and means linking said horizontal arm portion of said hand lever to said brake lever, said brake pedal being located on the side of the steering column near the side of the vehicle which is closest to said steering column and said means pivotally connecting said brake lever to said vehicle floor comprising means defining a toggle.

4. In an automotive vehicle having a steering wheel, a steering column, a brake pedal, and a vehicle floor; an attachment for operating said brake pedal by hand comprising a hand lever having an upright arm portion provided with a handle free of said steering wheel and a horizontal arm portion, said horizontal arm portion being pivotally connected to said steering column by a pivot fixed against movement longitudinally with respect to said steering column, a brake lever pivotally connected to said brake pedal, means pivotally connecting the central portion of said brake lever to said vehicle floor, and means linking said horizontal arm portion of said hand lever to said brake lever, said brake pedal being located on the side of the steering column near the middle of the car and said means pivotally connecting said brake lever to said vehicle floor comprising means defining a universal joint.

5. In an automotive vehicle having a steering wheel, a steering column, a brake pedal, an accelerator pedal, a vehicle floor, and a vehicle seat, an attachment for operating said brake pedal by hand comprising a hand lever having an upright arm portion provided with a handle free of said steering wheel and horizontal arm portion, said horizontal arm portion being pivotally connected to said steering column by a pivot fixed against movement longitudinally with respect to said steering column, a brake lever pivotally connected at one end to said brake pedal, means pivotally connecting said brake lever intermediate its ends to said vehicle floor, a connecting link having mechanical connection at one end with said horizontal arm portion of said hand lever and a mechanical connection at its other end with the opposite end of said brake lever, an accelerator lever having a first arm portion and a second arm portion substantially normal to each other and pivotally connected to said steering column below said hand lever, a third arm portion on said accelerator lever normal to said arm portions and extending generally normal to the steering column and toward said vehicle seat for operation by the knee or the side of the leg of an operator, and means linking said accelerator lever to said accelerator pedal.

References Cited in the file of this patent
UNITED STATES PATENTS

| | | |
|---|---|---|
| 1,117,661 | Gourlay | Nov. 17, 1914 |
| 1,234,344 | Josephson | July 24, 1917 |
| 1,324,757 | Wilson | Dec. 9, 1919 |
| 1,402,838 | Cline et al. | Jan. 10, 1922 |
| 1,586,003 | Noble | May 25, 1926 |
| 1,906,366 | Burns | May 2, 1933 |
| 2,112,962 | Hug | Apr. 5, 1938 |
| 2,280,157 | Mead | Apr. 21, 1942 |
| 2,504,729 | Rajan | Apr. 18, 1950 |
| 2,539,994 | Engler | Jan. 30, 1951 |
| 2,602,348 | Wilson | July 8, 1952 |
| 2,658,409 | Hughes | Nov. 10, 1953 |
| 2,674,902 | Sell | Apr. 13, 1954 |
| 2,707,886 | Lerman | May 10, 1955 |
| 2,777,335 | Engberg et al. | Jan. 15, 1957 |
| 2,826,089 | Hammack | Mar. 11, 1958 |

FOREIGN PATENTS

| | | |
|---|---|---|
| 513,292 | France | Oct. 29, 1920 |